US012767338B2

(12) United States Patent
Hanke et al.

(10) Patent No.: US 12,767,338 B2
(45) Date of Patent: Oct. 20, 2026

(54) AIRCRAFT COMPRISING AT LEAST ONE DEFLECTOR CONFIGURED TO DIVERT A GAS EXHAUST CONE EXITING A PROPULSION ASSEMBLY AWAY FROM A TRAILING EDGE OF A WING

(71) Applicants: Airbus Operations SAS, Toulouse (FR); Airbus Operations GmbH, Hamburg (DE)

(72) Inventors: Jean-Marc Hanke, Hamburg (DE); Sentamil Selvan Gurunathan, Hamburg (DE); Jérôme Huber, Toulouse (FR); Thierry Fargier, Toulouse (FR); Stéphane Galdeano, Toulouse (FR); Jean-Paul Romeo, Toulouse (FR)

(73) Assignees: Airbus Operations SAS, Toulouse (FR); Airbus Operations GmbH, Hamburg (DE)

( * ) Notice: Subject to any disclaimer, the term of this patent is extended or adjusted under 35 U.S.C. 154(b) by 89 days.

(21) Appl. No.: 18/784,138

(22) Filed: Jul. 25, 2024

(65) Prior Publication Data

US 2026/0054845 A1 Feb. 26, 2026

(30) Foreign Application Priority Data

Jul. 27, 2023 (FR) .................................. FR2308114

(51) Int. Cl.
*B64D 27/40* (2024.01)
*B64D 29/02* (2006.01)

(52) U.S. Cl.
CPC ........... *B64D 27/402* (2024.01); *B64D 29/02* (2013.01)

(58) Field of Classification Search
CPC ...... B64D 27/40; B64D 27/402; B64C 23/00; B64C 23/005
See application file for complete search history.

(56) References Cited

U.S. PATENT DOCUMENTS 4,314,681 A * 2/1982 Kutney .................. B64D 29/02 244/54
7,802,752 B2 * 9/2010 Papamoschou ........... F02K 1/42 244/54
8,627,644 B2 * 1/2014 Vauchel .................... F02K 1/72 60/226.3

(Continued)

FOREIGN PATENT DOCUMENTS

FR 2905930 B1 * 5/2009

OTHER PUBLICATIONS

French Search Report for corresponding French Patent Application No. 2308114 dated Feb. 8, 2024.

*Primary Examiner* — Joshua D Huson
*Assistant Examiner* — Anna L. Gordon
(74) *Attorney, Agent, or Firm* — Greer, Burns & Crain, Ltd.

(57) ABSTRACT

An aircraft comprising: a wing, a propulsion unit which comprises a nozzle having a trailing edge, a pylon connecting the propulsion assembly and the wing, which comprises at least one secondary rear fairing having a lower face, offset rearward with respect to the trailing edge, which forms an angle of between 2 and 20° with the inner face of the nozzle. The secondary rear fairing forms a deflector which interferes with the gas exhaust cone exiting the propulsion assembly.

9 Claims, 3 Drawing Sheets

(56) References Cited

U.S. PATENT DOCUMENTS

| | | | | |
|---|---|---|---|---|
| 8,651,426 | B2 * | 2/2014 | Morvant | B64D 29/02 244/54 |
| 9,725,183 | B2 * | 8/2017 | Aten | B64D 29/02 |
| 10,011,365 | B2 * | 7/2018 | Shephard | B64D 29/02 |
| 2012/0001022 | A1 | 1/2012 | Morvant et al. | |
| 2014/0290270 | A1 | 10/2014 | Bodard et al. | |
| 2016/0040627 | A1 | 2/2016 | Zsurka | |
| 2021/0163143 | A1 * | 6/2021 | Mercat | B32B 5/18 |

* cited by examiner

AIRCRAFT COMPRISING AT LEAST ONE DEFLECTOR CONFIGURED TO DIVERT A GAS EXHAUST CONE EXITING A PROPULSION ASSEMBLY AWAY FROM A TRAILING EDGE OF A WING

CROSS-REFERENCES TO RELATED APPLICATIONS

This application claims the benefit of French Patent Application Number 2308114 filed on Jul. 27, 2023, the entire disclosure of which is incorporated herein by way of reference.

FIELD OF THE INVENTION

The present application relates to an aircraft comprising at least one deflector configured to divert a gas exhaust cone exiting a propulsion assembly away from a trailing edge of a wing.

BACKGROUND OF THE INVENTION

According to an embodiment visible in FIG. 1, an aircraft 10 comprises a fuselage 12, a wing 14 and propulsion assemblies 16 positioned under the wing 14 and connected to the latter by pylons 18.

As illustrated in FIG. 2, the wing 14 extends between a leading edge 14.1 and a trailing edge 14.2. The wing 14 comprises, at its trailing edge 14.2, at least one pivoting high-lift flap 20 that is movable between a first position in which the high-lift flap 20 is situated in the extension of the wing 14 and a second, lowered position in which the trailing edge 14.2 is offset downward so as to increase the lift of the wing 14.

According to an embodiment of the prior art, as illustrated in FIGS. 2 and 3, each propulsion assembly 16 comprises an engine 22 and a nacelle 24 surrounding the engine 22 so as to delimit, with the engine 22, a secondary air duct 26.

For the present application, a longitudinal direction is parallel to the axis A22 of the engine 22. The terms “front” and “rear” refer to the direction of flow of the air flow in the engine 22 in operation, the air flow flowing from the front to the rear. The terms “upper” and “lower” refer to a position along a vertical axis, an upper element being further from the ground than a lower element when the aircraft is on the ground.

The engine 22 comprises, in the rear part, a first nozzle 28 via which a primary air flow passing through the engine 22 is ejected. The nacelle 24 comprises, in its rear part, a second nozzle 30 via which the secondary air flow channeled by the secondary air duct 26 is ejected. According to one configuration, the first nozzle 28 has a first trailing edge 28.1 offset rearward with respect to the second trailing edge 30.1 of the second nozzle 30.

Each pylon 18 comprises a rigid primary structure, which ensures, inter alia, the transmission of forces between the engine 22 and the wing 14, and a secondary structure 32 which envelops the primary structure and limits the drag of the pylon 18. This secondary structure 32 comprises, on either side of a median plane PM, a front fairing 32.1, positioned at the front of the wing 14, and a rear fairing 32.2, referred to as the lower rear aerodynamic fairing or aft pylon fairing (APF), positioned at the rear of the nacelle 24. This secondary structure 32 extends into the secondary air duct 26 between the engine 22 and nacelle 24.

Each propulsion assembly 16 comprises a thrust reversal device. To this end, the nacelle 24 comprises a front part 24.1 and a rear part 24.2 which is movable between a deactivated position in which the rear part 24.2 is attached to the front part 24.1 and an activated position in which the rear part 24.2 is moved away from the front part 24.1 so as to generate a lateral opening between the front and rear parts 24.1, 24.2. In addition, the thrust reversal device comprises a guide and movement system configured to guide and move the rear part 24.2 with respect to the front part 24.1.

Since this guide and movement system has parts projecting with respect to the rear fairing 32.2, the pylon 18 comprises two secondary rear fairings 34.1, 34.2 positioned on either side of the rear fairing 32.2 and projecting with respect to the latter. As illustrated in FIG. 2, these secondary rear fairings 34.1, 34.2 comprise parts offset rearward with respect to the second trailing edge 30.1 of the second nozzle 30 that are situated in the extension of this second nozzle 30. These secondary rear fairings 34.1, 34.2 do not interfere with the secondary air flow exiting the second nozzle 30.

In operation, the air flows exiting the first and second nozzles 28, 30 form an exhaust cone 36 at the rear of the propulsion assembly 16, the angle of which increases away from the latter.

In certain circumstances, in particular when the high-lift flap 20 is in the lowered position (during the takeoff and landing phases), the exhaust cone 36 approaches or interferes with the trailing edge 14.2 of the wing 14, as illustrated in FIG. 2, which generates aerodynamic noise.

To improve their performance, propulsion assemblies have increasingly large diameters. Consequently, the gas exhaust cone exiting such propulsion assemblies is increasingly close to the wing 14, which tends to increase aerodynamic noise, in particular during the takeoff phase.

SUMMARY OF THE INVENTION

The present invention seeks to remedy all or some of the drawbacks of the prior art.

To this end, the invention relates to an aircraft comprising a wing, at least one propulsion assembly and, for each propulsion assembly, a pylon connecting the propulsion assembly and the wing. The propulsion assembly comprises a thrust reversal device, an engine axis and at least one nozzle which has a trailing edge and an inner face extending to the trailing edge and inclined with respect to the engine axis. The pylon comprises at least right and left lateral fairings positioned on either side of a median plane and at least one secondary rear fairing comprising, offset rearward with respect to the trailing edge of the nozzle, a lower face, an upper face and at least one edge connecting the lower and upper faces, which has a rear end and a point spaced apart from the median plane that is situated at the trailing edge of the nozzle.

According to the invention, the lower face of the secondary rear fairing forms, with the inner side of the nozzle, an angle of between 2 and 20°, the lower face of the secondary rear fairing and the engine axis forming an angle greater than that formed between the inner face of the nozzle and the engine axis, each secondary rear fairing being configured to house at least one piece of equipment of the thrust reversal device.

According to this arrangement, the secondary rear fairing forms a deflector which interferes with the gas ejection cone exiting the propulsion assembly so as to divert it away from the trailing edge of the wing. This solution makes it possible to reduce aerodynamic noise.

According to another feature, the angle formed between the lower face of the secondary rear fairing and the inner face of the nozzle is of the order of (+/−10%) 12°. According to another feature, the pylon comprises right and left secondary rear fairings respectively projecting with respect to the right and left lateral fairings.

According to another feature, the nozzle has an outlet diameter measured at the trailing edge. In addition, each secondary rear fairing has an offset length, corresponding to a distance separating the rear end and the trailing edge of the nozzle, of between 25 and 100% of the outlet diameter of the nozzle.

According to another feature, the offset length is substantially (+/−10%) equal to 50% of the outlet diameter of the nozzle.

According to another feature, the nozzle has an outlet diameter measured at the trailing edge. In addition, each secondary rear fairing has a width of between 4 and 20% of the outlet diameter of the nozzle.

According to another feature, the width is substantially equal to 11% of the outlet diameter of the nozzle.

According to another feature, the nozzle has an outlet area measured at the trailing edge. In addition, the lower face of each secondary rear fairing has an area of between 2 and 10% of the outlet area of the nozzle.

According to another feature, the area of the lower face of each secondary rear fairing is substantially equal to 4% of the outlet area of the nozzle.

BRIEF DESCRIPTION OF THE DRAWINGS

Other features and advantages will become apparent from the following description of the invention, which description is given solely by way of example, with reference to the appended drawings, in which.

DETAILED DESCRIPTION OF THE PREFERRED EMBODIMENTS

Figure 1:
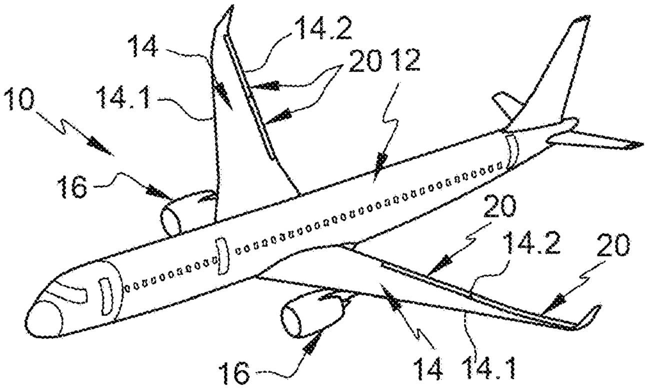
FIG. 1 is a perspective view of an aircraft.
Figure 2:
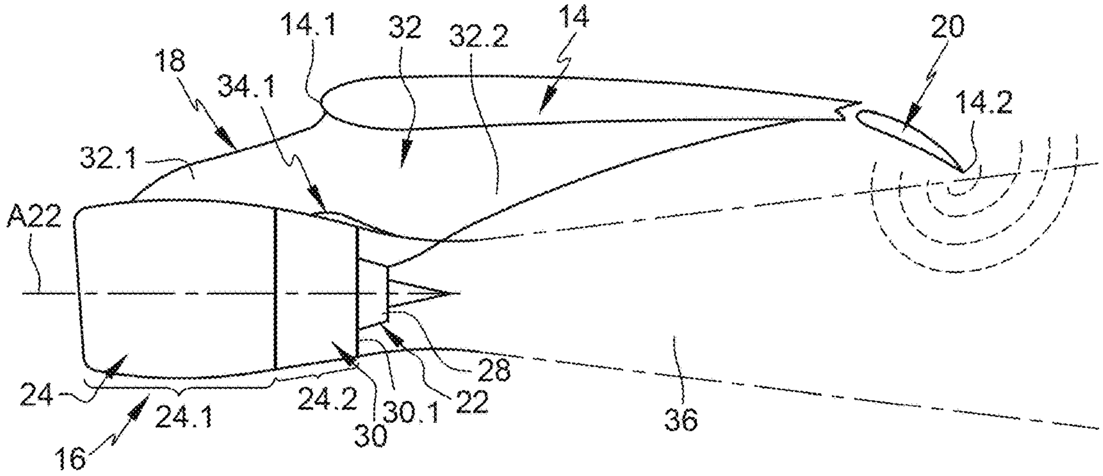
Fig. 2 (Prior Art)
FIG. 2 is a schematic side view of a propulsion assembly illustrating an embodiment of the prior art.
Figure 3:
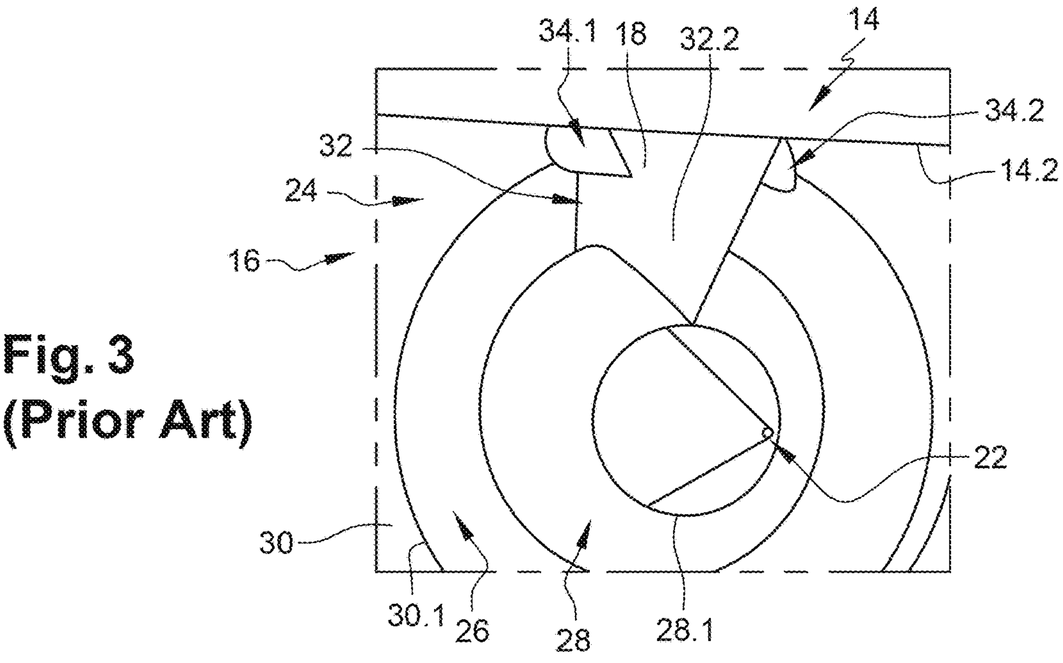
Fig. 3 (Prior Art)
FIG. 3 is a perspective view of a propulsion assembly illustrating an embodiment of the prior art.
Figure 4:
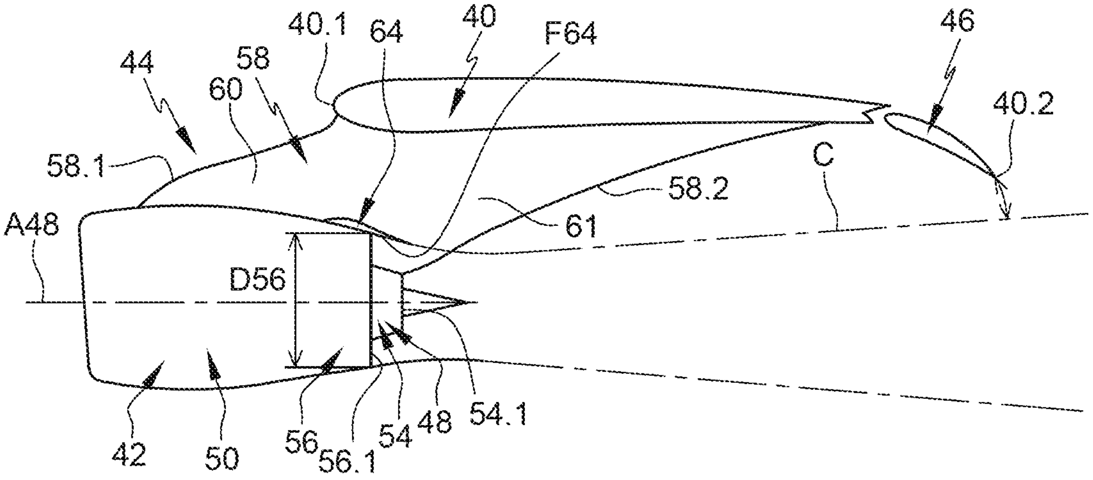
FIG. 4 is a schematic side view of a propulsion assembly illustrating an embodiment of the invention.
Figure 5:
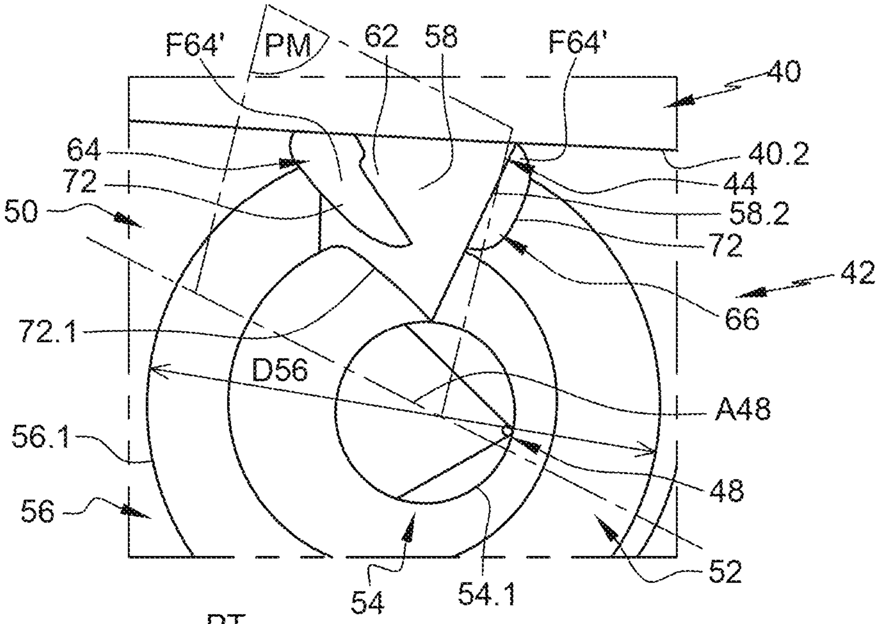
FIG. 5 is a perspective view of a propulsion assembly illustrating an embodiment of the invention.
Figure 6:
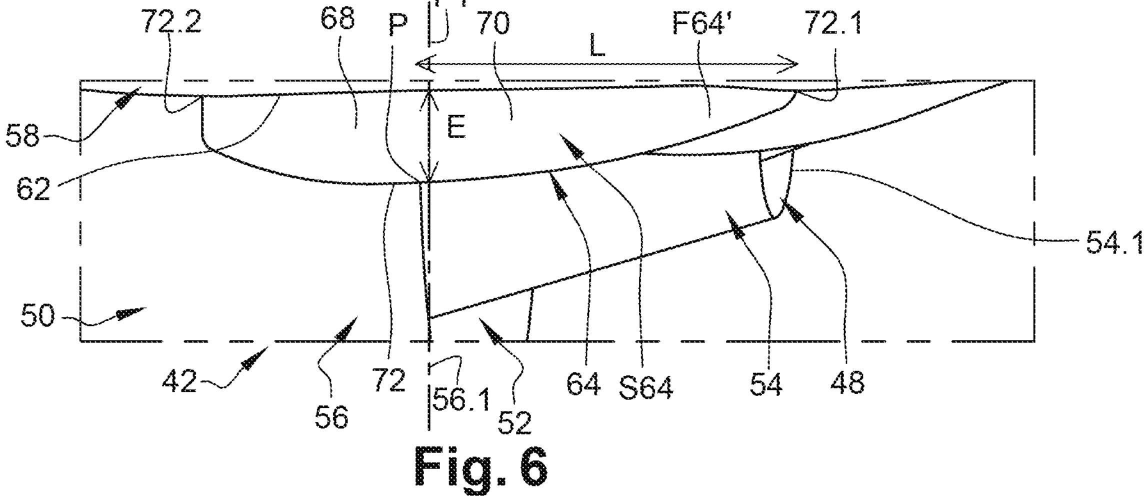
FIG. 6 is a schematic top view of a rear part of a propulsion assembly equipped with a secondary rear fairing illustrating an embodiment of the invention.
Figure 7:
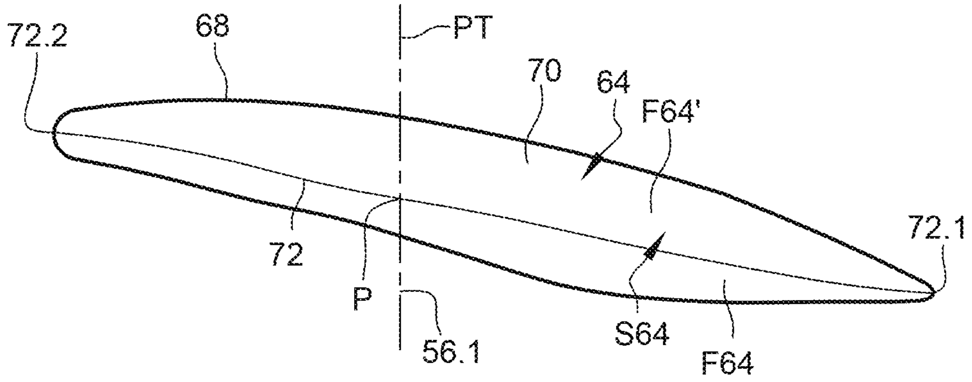
FIG. 7 is a schematic side view of a secondary rear fairing illustrating an embodiment of the invention.

According to an embodiment visible in FIGS. 4 and 5, an aircraft comprises a fuselage, a wing 40 and at least one propulsion assembly 42 which comprises a pylon 44 for connecting it to the wing 40.

As illustrated in FIG. 4, the wing 40 extends between a leading edge 40.1 and a trailing edge 40.2. It comprises, at its trailing edge 40.2, at least one pivoting high-lift flap 46 which is movable between a first position in which the high-lift flap 46 is positioned in the extension of the wing 40 and a second, lowered position in which the trailing edge 40.2 is offset downward so as to increase the lift of the wing 40.

As illustrated in FIG. 5, each propulsion assembly 42 comprises an engine 48 and a nacelle 50 surrounding the engine 48 so as to delimit, with the engine 48, a secondary air duct 52. The engine 48 has an engine axis A48.

The engine 48 comprises, in the rear part, a first nozzle 54 via which a primary air flow is ejected, which nozzle has a first trailing edge 54.1. The nacelle 50 comprises, in the rear part, a second nozzle 56 via which a secondary air flow channeled by the secondary air duct 52 is ejected, this second nozzle 56 having a second trailing edge 56.1. According to one configuration, the first trailing edge 54.1 of the first nozzle 54 is offset rearward with respect to the second trailing edge 56.1 of the second nozzle 56.

Figure 8:
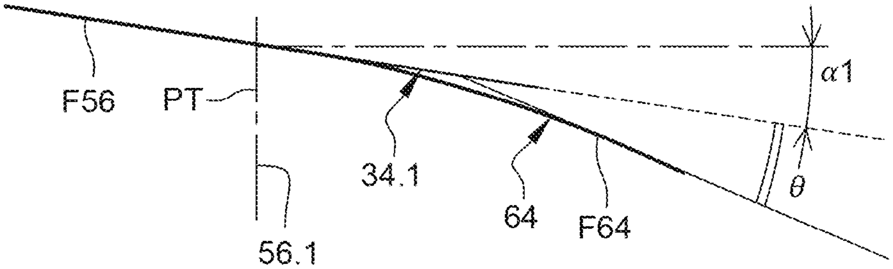
FIG. 8 is a schematic representation comparing a lower face of a secondary rear fairing according to an embodiment of the prior art and according to an embodiment of the invention, and, FIG. 9 is a diagram illustrating measurement curves for aerodynamic noise in the presence of a secondary rear fairing according to an embodiment of the prior art and according to an embodiment of the invention.

The second nozzle 56 has an inner face F56 which extends to the second trailing edge 56.1 and forms a first angle $\alpha$1 with a longitudinal direction parallel to the engine axis A48, as illustrated in FIG. 8. The second nozzle 56 has an outlet diameter D56 and an outlet area which are measured at the second trailing edge 56.1.

In operation, the air flows exiting the first and second nozzles 54, 56 form an exhaust cone C at the rear of the propulsion assembly 42, the angle of which increases away from the latter.

Each pylon 44 comprises a rigid primary structure, which ensures, inter alia, the transmission of forces between the engine 48 and the wing 40, and a secondary structure 58 which envelops the primary structure and limits the drag of the pylon 44.

This secondary structure 58 is substantially symmetrical with respect to a median plane PM and extends between a leading edge 58.1 and a trailing edge 58.2. This secondary structure 58 comprises right and left parts, positioned on either side of the median plane PM, each comprising a right or left front fairing 60, positioned at the front of the wing 40, which extends from the leading edge 58.1, and a right or left rear fairing 61, referred to as the lower rear aerodynamic fairing of aft pylon fairing (APF), positioned at the rear of the nacelle 50, which extends to the trailing edge 58.2 of the secondary structure 58. The latter extends into the secondary air duct 52 between the engine 48 and nacelle 50.

Of course, the invention is not limited to this embodiment for the aircraft and the propulsion assembly 42. Whatever the embodiment, the aircraft comprises a wing 40, at least one propulsion assembly 42 and, for each propulsion assembly 42, a pylon 44 for connecting the propulsion assembly 42 to the wing, the propulsion assembly 42 comprising an engine axis A48 and at least one nozzle 56 which has a trailing edge 56.1 and an inner face F56 inclined with respect to the engine axis A48 and extending to the trailing edge 56.1, the pylon 44 comprising at least right and left lateral fairings 62 positioned on either side of a median plane PM.

According to one configuration, the secondary structure 58 comprises right and left secondary rear fairings 64, 66, positioned on either side of the secondary structure 58, respectively projecting with respect to the right and left lateral fairings 62. The right and left secondary rear fairings 64, 66 are substantially symmetrical with respect to the median plane PM.

These right and left secondary rear fairings are configured to house at least one piece of equipment of a thrust reversal device, such as a guide and movement system, for example.

According to one configuration, each right or left secondary rear fairing 64, 66 comprises a front part 68 offset forward with respect to a transverse plane PT containing the second trailing edge 56.1 of the second nozzle 56, and a rear part 70 offset rearward with respect to the transverse plane PT.

According to one configuration, the right and left secondary rear fairings 64, 66 do not extend beyond the trailing edge 58.2 of the secondary structure 58 of the pylon 44.

Each right or left secondary rear fairing 64, 66 comprises a lower face F64 (oriented toward the ground when the aircraft is on the ground), an upper face F64' opposite the lower face F64) and an edge 72 connecting the lower and upper faces F64, F64'. The edge 72 extends between rear and front ends 72.1, 72.2 situated at the right or left lateral fairing 62. According to one configuration, the edge 72 progressively moves away from the right or left lateral fairing 62 from the rear end 72.1 to a spaced-apart point P (the furthest away from the right or left lateral fairing 62) and then, from this spaced-apart point P, progressively approaches the right or left lateral fairing 62 to the front end 72.2. According to one arrangement, the spaced-apart point P is situated at the transverse plane PT, in line with the second trailing edge 56.1 of the second nozzle 56.

According to another configuration, the right and left secondary rear fairings 64, 66 extend beyond the trailing edge 58.2 of the secondary structure of the pylon 44. According to this configuration, the parts of the right and left secondary rear fairings 64, 66 that are offset rearward with respect to the trailing edge 58.2 of the secondary structure 58 of the pylon 44 form a single secondary rear fairing which comprises a lower face F64, an upper face F64' and two edges connecting the lower and upper faces F64, F64' that are symmetrical with respect to the median plane PM and have a common rear end 72.1 situated at the median plane PM.

Whatever the embodiment, the pylon 44 comprises at least one secondary rear fairing 64 comprising, offset rearward with respect to the second trailing edge 56.1 of the second nozzle 56, a lower face F64, an upper face F64' and at least one edge 72 connecting the lower and upper faces F64, F64' that has a rear end 72.1 closest to the median plane PM and furthest away from the second trailing edge 56.1 of the second nozzle 56, and a spaced-apart point P situated at the second trailing edge 56.1 of the second nozzle 56.

Each secondary rear fairing 64, 66 has a width E corresponding to a distance separating the spaced-apart point P and the right or left lateral fairing 62, an offset length L corresponding to a distance separating the rear end 72.1 and the second trailing edge 56.1 of the second nozzle 56, and an area S64 corresponding to the area of the lower face F64 offset rearward with respect to the second trailing edge 56.1 of the second nozzle 56, in contact with the secondary air flow exiting the second nozzle 56.

According to one feature of the invention, the lower face F64 of each secondary rear fairing 64, 66 forms, with the inner face F56 of the second nozzle 56, an angle $\theta$ of between 2 and 20°, preferably greater than 5°, of the order of 12°, the angle between the lower face F64 of each secondary rear fairing 64, 66 and the longitudinal direction being greater than the angle $\alpha 1$ between the inner face F56 of the second nozzle 56 and the longitudinal direction, as illustrated in FIG. 8. Thus, each secondary rear fairing 64, 66 forms a deflector which interferes with the gas exhaust cone C exiting the propulsion assembly 42 so as to divert it away from the trailing edge 40.2 of the wing 40, as illustrated in FIG. 4. This solution makes it possible to reduce aerodynamic noise likely to appear because of the interaction of the trailing edge 40.2 of the wing 40 and the gas exhaust cone C exiting the propulsion assembly 42.

Figure 9:
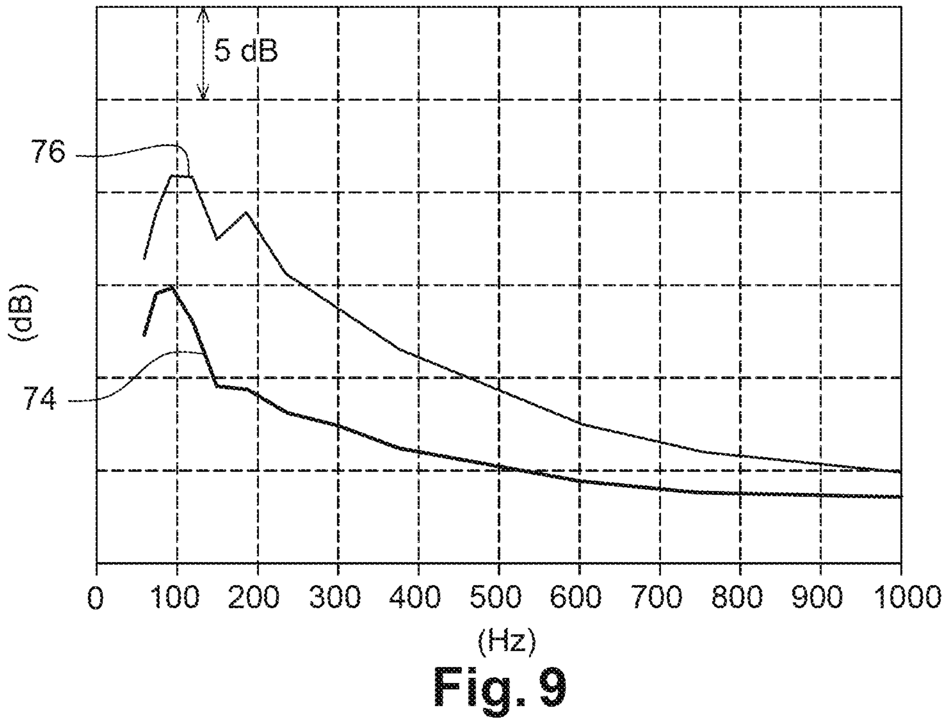

As illustrated in FIG. 9, a first measurement curve 74 for aerodynamic noise in the presence of at least one secondary rear fairing 64, 66 interfering with the gas exhaust cone C exiting the propulsion assembly 42 is offset downward with respect to a second measurement curve 76 for aerodynamic noise in the presence of at least one secondary rear fairing 64, 66 which does not interfere with the gas exhaust cone C exiting the propulsion assembly 42. By way of indication, the fact of providing at least one secondary rear fairing 64, 66 which interferes with the secondary air flow makes it possible to obtain a reduction in the sound level of the order of 5 dB for the sound frequencies generating the highest sound levels.

According to another particular feature, the offset length L of each secondary rear fairing 64, 66 is between 25 and 100% of the outlet diameter D56 of the second nozzle 56. According to one configuration, the offset length L is substantially equal to 50% of the outlet diameter D56 of the second nozzle 56. According to one embodiment, a secondary rear fairing 64, 66 according to the invention has an offset length L increased by about 50% with respect to that of a secondary rear fairing of the prior art.

According to another particular feature, the area S64 of the lower face F64 of each secondary rear fairing 64, 66 is between 2 and 10% of the outlet area of the second nozzle 56. According to one configuration, the area S64 of the lower face F64 of each secondary rear fairing 64, 66 is substantially equal to 4% of the outlet area of the second nozzle 56.

According to another particular feature, the width E of each secondary rear fairing 64, 66 is between 4 and 20% of the outlet diameter D56 of the second nozzle 56. According to one configuration, the width E is substantially equal to 11% of the outlet diameter D56 of the second nozzle 56.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a wing, at least one propulsion assembly, and for each propulsion assembly, a pylon connecting the propulsion assembly and the wing, each propulsion assembly comprising a thrust reversal device, an engine axis and at least one nozzle which has a trailing edge and an inner face extending to the trailing edge and inclined with respect to the engine axis, the pylon comprising at least right and left lateral fairings positioned on either side of a median plane and at least one secondary rear fairing comprising, offset rearward with respect to the trailing edge of the nozzle, a lower face, an upper face and at least one edge connecting the lower and upper faces, which has a rear end and a point spaced apart from the median plane and aligned with the trailing edge of the nozzle, wherein the lower face of the at least one secondary rear fairing forms, with the inner face of the nozzle, an angle of between 2 and 20°, the lower face of the at least one secondary rear fairing and the engine axis forming an angle greater than an angle formed between the inner face of the nozzle and the engine axis, and wherein each secondary rear fairing is configured to house at least one piece of equipment of the thrust reversal device and forms a deflector which diverts a gas exhaust cone exiting the at least one propulsion assembly away from a trailing edge of the wing.

2. The aircraft as claimed in claim 1, wherein the angle formed between the lower face of the at least one secondary rear fairing and the inner face of the nozzle is of the order of 12°.

3. The aircraft as claimed in claim 1, wherein the at least one secondary rear fairing of the pylon comprises a right secondary rear fairing and a left secondary rear fairings respectively projecting with respect to the right and left lateral fairings.

4. The aircraft as claimed in claim 1, wherein the nozzle has an outlet diameter measured at the trailing edge, and wherein each secondary rear fairing has an offset length, corresponding to a distance separating the rear end and the trailing edge of the nozzle, of between 25 and 100% of the outlet diameter of the nozzle.

5. The aircraft as claimed in claim 4, wherein the offset length is substantially equal to 50% of the outlet diameter of the nozzle.

6. The aircraft as claimed in claim 1, wherein the nozzle has an outlet diameter measured at the trailing edge, and wherein each secondary rear fairing has a width of between 4 and 20% of the outlet diameter of the nozzle.

7. The aircraft as claimed in claim 6, wherein the width is substantially equal to 11% of the outlet diameter of the nozzle.

8. The aircraft as claimed in claim 1, wherein the nozzle has an outlet area measured at the trailing edge, and wherein the lower face of each secondary rear fairing has an area of between 2 and 10% of the outlet area of the nozzle.

9. The aircraft as claimed in claim 8, wherein the area of the lower face of each secondary rear fairing is substantially equal to 4% of the outlet area of the nozzle.

* * * * *